United States Patent [19]

Beaulieu et al.

[11] Patent Number: 5,796,245

[45] Date of Patent: Aug. 18, 1998

[54] PROCESS AND DEVICE FOR CONTROLLING THE POWER OF A LOAD VIA A PHASE ADJUSTMENT SYSTEM

[75] Inventors: Alain Bernard Marc Beaulieu, Alencon; Pierre Epinat, Ifs; Laurent Chapellier, Caen, all of France

[73] Assignee: Moulinex S. A., Paris, France

[21] Appl. No.: 817,948

[22] PCT Filed: Oct. 18, 1995

[86] PCT No.: PCT/FR95/01371

§ 371 Date: Apr. 28, 1997

§ 102(e) Date: Apr. 28, 1997

[87] PCT Pub. No.: WO96/13894

PCT Pub. Date: May 9, 1996

[30] Foreign Application Priority Data

Oct. 26, 1994 [FR] France ................... 94 12833

[51] Int. Cl.⁶ ........................................ G05F 1/455
[52] U.S. Cl. .................. 323/322; 323/237; 323/241; 323/320
[58] Field of Search .................. 323/237, 239, 323/241, 320, 322, 324

[56] References Cited

U.S. PATENT DOCUMENTS

| 4,528,494 | 7/1985 | Bloomer | 323/237 |
| 4,567,425 | 1/1986 | Bloomer | 323/237 |
| 5,519,311 | 5/1996 | Widmayer | 323/239 |

FOREIGN PATENT DOCUMENTS

| 29 08 563 | 9/1980 | Germany | H02P 7/00 |
| 41 30 532 | 3/1993 | Germany | H02P 7/622 |

*Primary Examiner*—Jeffrey L. Sterrett
*Attorney, Agent, or Firm*—Young & Thompson

[57] ABSTRACT

A method for controlling the power supplied to a load (1) which is powered by an AC voltage source U with a period T via a generalised phase adjustment system, includes the steps of periodically delivering a sequence of p elements to the load (1), in accordance with a predetermined set power, wherein p is an integer and each element comprises $n_i$ periods T, where $n_i$ is an integer, during which the voltage U is divided symmetrically at an angle $\alpha_i$, the consecutive phase angles $\alpha_i$ and $\alpha_{i+1}$ being different, and the combination of angles $\alpha_1 \ldots \alpha_i \ldots \alpha_p$ being selected in such a way that they limit current harmonics, and limit a flicker effect. The method is particularly suitable for power control in electric motors.

9 Claims, 5 Drawing Sheets

| Harmonic Levels | Maximum Acceptable Limit (im amperes) |
|---|---|
| 2 | 1.08 |
| 3 | 2.30 |
| 4 | 0.43 |
| 5 | 1.14 |
| 6 | 0.30 |
| 7 | 0.77 |
| 8 | 0.23 |
| 9 | 0.40 |
| 10 | 0.184 |
| 11 | 0.33 |
| 12 | 0.153 |
| 13 | 0.21 |
| 14 | 0.13 |
| 15 | 0.15 |
| 16 | 0.115 |
| 17 | 0.132 |
| 18 | 0.102 |
| 19 | 0.118 |
| 20 | 0.092 |
| 21 | 0.107 |
| 22 | 0.084 |
| 23 | 0.098 |
| 24 | 0.077 |
| 25 | 0.09 |
| 26 | 0.071 |
| 27 | 0.083 |
| 28 | 0.055 |
| 29 | 0.078 |
| 30 | 0.081 |
| 31 | 0.073 |
| 32 | 0.058 |
| 33 | 0.068 |
| 34 | 0.054 |
| 35 | 0.064 |
| 36 | 0.051 |
| 37 | 0.061 |
| 38 | 0.048 |
| 39 | 0.058 |
| 40 | 0.046 |

FIG. 5
PRIOR ART

PROCESS AND DEVICE FOR CONTROLLING THE POWER OF A LOAD VIA A PHASE ADJUSTMENT SYSTEM

BACKGROUND OF THE INVENTION

The present invention relates to a process and a device for controlling the electric power supplied to a load powered by an AC voltage source via a system of generalized phase adjustment.

Prior art techniques used to control a loaded power adjuster either divide the supply voltage of the sector according to a phase angle that can be set as a function of the required power while the load is being supplied, or control, in the so-called wave train method, by altenrnately placing the load in circuit and then out of circuit according to a frequency selected by the user.

The first control mode by phase division, when the control power called full wave is high, prevents a whole range of phase angle adjustments which in turn leads to current harmonics that are too high which obstructs users connected to the same power source.

As to the second control mode, the so-called wave train, it is seen to be unusable particularly for control of the speed of electric motors for vacuum cleaners or washing machines, for example. Thus, such a control leads to variations of speed generating noise that are very annoying to the users.

As can be seen in FIGS. 1 and 3, the conventional phase control, applied either to a resistive load, or to a slightly inductive load such as a motor, consists in dividing an AC voltage from a power source, such as for example the conventional network U=230V.50 Hz, according to an invariable phase angle $\alpha_0$ corresponding to a duration $t_0$ during which the AC current is zero. This repetition of the phase angle permits obtaining a predetermined power for the necessary duration of use. So as to obtain several powers, the angle can be varied by means of a conventional variable switch, for example of the TRIAC type.

FIG. 2 shows a sinusoidal supply voltage U of the same type as shown in FIG. 1 and divided according to a wave train comprising a duration $t_3$ during which the load of the resistive type is supplied, followed by a duration $t_4$ during which the supply of the load is interrupted. This type of supply is suitable for resistive loads of the heating type but is not suitable for resistive loads of the lighting type or inductances of the electric motor type because it gives rise to variations of voltage which generate frequencies of the motor in troublesome spectra, either visible, giving rise to sparking, or acoustical and vibratory, giving rise to impermissible noise.

The diagram shown in FIG. 4 shows a curve traced according to Standard EN60555-3, showing the relative variations of voltage $\Delta U/U$ as a function of the number of these variations per second, this curve delimiting an authorized region located between itself and the axis of the abscissae and in which the FLICKER effect is at an acceptable level.

The table of FIG. 5 comprises, in a first column, the order of the different harmonics, and in the second column the effective current limitations imposed particularly by Standard EN60555-2.

SUMMARY OF THE INVENTION

The object of the invention is to overcome these drawbacks and to satisfy particularly the standards concerning the limitation of disturbances imposed on the circuits by electrical apparatus particularly the Standards EN60555-2, CEI555-2, as well as their modifications EN61000-3-2 and CEI1000-3-2, limiting the levels of harmonic currents, and the Standards EN60555-3, CEI555-3, as well as their modifications EN61000-3-3 and CEI1000-3-3, limiting the relative variations of voltage as a function of the number of these variations per time unit for an impedance source defined by the standard and which are the cause of disturbances known as "FLICKER".

According to a predetermined set power, there is delivered successively to the load, periodically, a sequence of a whole number p of elements, p being greater than one, each element, of number i, of the sequence being characterized by a whole number of $n_i$ of periods T during which the AC voltage U is divided symmetrically according to a phase angle $\alpha_i$ corresponding to a duration $t_i$ during which the load is not powered, the consecutive phase angles $\alpha_i$ of the element i and $\alpha_{i+1}$ of the element i+1 being different and the combination of the angles $\alpha_1 \ldots \alpha_i \ldots \alpha_p$ being selected such that, while supplying to the load the desired power, it satisfies on the one hand the limitation of the effective values of the current harmonics at predetermined values, and on the other hand the maintenance within a permitted region, delimited by a predetermined curve, of the relative variations of voltage $\Delta U/U$ as a function of the number of variations per unit time on a predetermined impedance source.

Thanks to this alteration of the elements, the effective voltage can be varied over relatively great power ranges, while respecting the constraints imposed by the harmonic FLICKER Standards.

BRIEF DESCRIPTION OF THE DRAWINGS

The characteristics and advantages of the invention will become apparent from the description which follows, by way of non-limiting example, with reference to the accompanying drawings, in which:

FIG. 5 shows by way of example a table of the limits of current harmonics imposed by Standard EN60555-2 for each current harmonic;

DESCRIPTION OF THE PREFERRED EMBODIMENT

Figure 8:
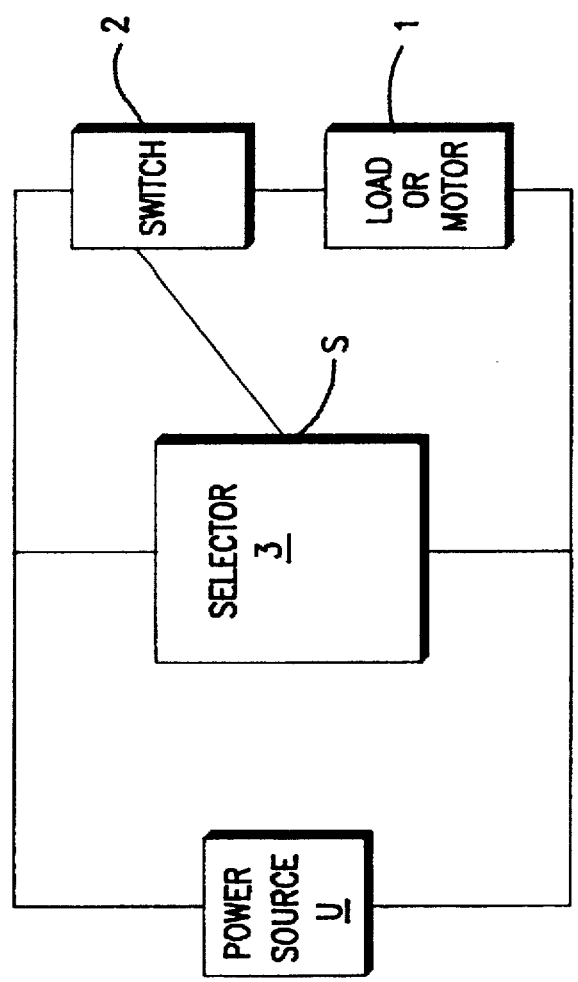
FIG. 8 is a synoptic schematic view of a power control device according to the invention.

Referring now to FIG. 8, there is schematically represented a supply device of a load 1 connected to a supply source, such as for example an AC voltage network U=230V, of a period T=20 ms, by means of a system with generalized phase adjustment such as for example a continuous variable switch comprising an electronic switch 2 of the TRIAC type.

According to the invention, for a predetermined set power, there is delivered successively to load 1, periodically a sequence of a whole number p of elements, p being greater than one, each element, of number i, of the sequence being characterized by the integer $n_i$ of periods T during which the AC current U is divided symmetrically according to a phase angle $\alpha_i$ corresponding to a duration $t_i$ during which the load 1 is not powered, the consecutive phase angles $\alpha_i$ of the element i and $\alpha_{i+1}$ of the element i+1 being different and the combination of the angles $\alpha_1 \ldots \alpha_i \ldots \alpha_p$ being selected such that, while supplying to the load 1 the desired power, it satisfies on the one hand the limitation of effective values of the current harmonics at predetermined values, and on the other hand the maintenance in an authorized region, delimited by a predetermined curve, of the relative variations of voltage $\Delta U/U$ as a function of the number of variations per unit time on a predetermined impedance source.

Figure 6:
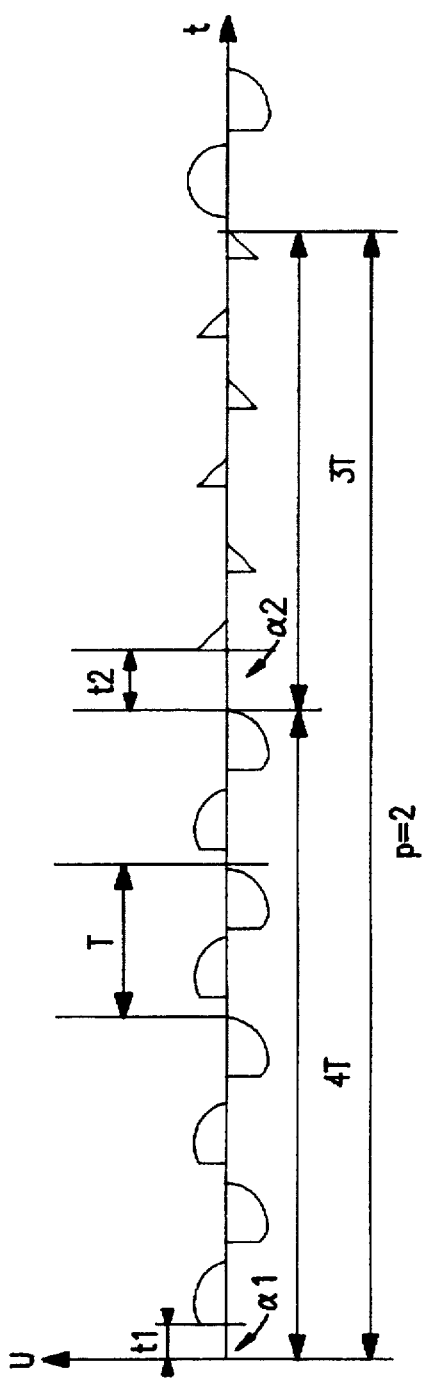
FIG. 6 is a diagram showing the variations as a function of time of the instantaneous voltage in the power control according to a first embodiment of the invention.

According to a first preferred embodiment and as shown in FIG. 6, the number of elements of the sequences selected to be two (p=2) and the first element $i_1$ comprises, for example, four periods T divided each according to a phase angle $\alpha_i$, whilst the second element $i_2$ comprises for example three periods T divided each according to a phase angle $\alpha_2$ different from $\alpha_1$, the angles $\alpha_1$ and $\alpha_2$ being selected such that the couple $\alpha_1$, $\alpha_2$, while supplying to the load 1 the desired power, satisfied the conditions described above.

Thanks to the invention, for a given target of high power, for example greater than 1,000 Watts, there can now be caused to vary in a continuous fashion the effective voltage and hence the power while respecting the harmonic limits and the limits of FLICKER. Thus, the control by a continuously variable electronic switch permits obtaining, for example, an adjustment of the luminosity of a lamp without disagreeable blinking or the adjustment of the speed of a motor over a range of high powers without disturbing the network and in a silent manner.

Figure 7:
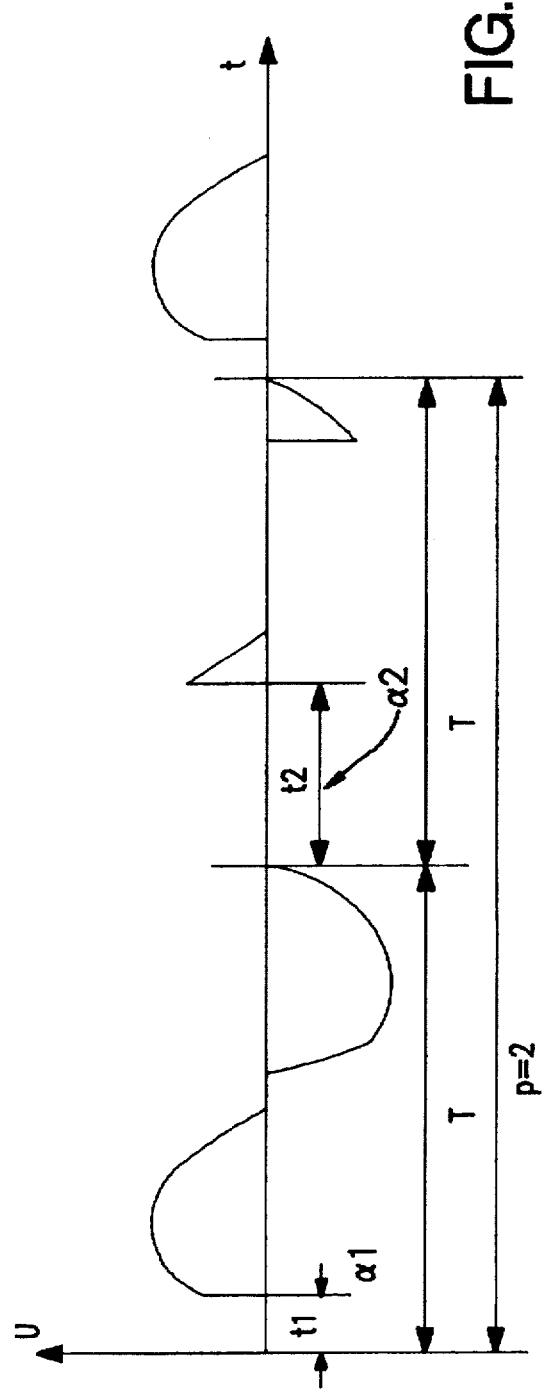
FIG. 7 is a diagram showing the variations as a function of time of the instantaneous voltage in the power control according to a second preferred embodiment of the invention.

According to second preferred embodiment of the invention, shown in FIG. 7 and which can be called alternate phase division, the number p of elements is maintained to be two, while the p numbers $n_1$ and $n_2$ are both equal to one. In this case, the load 1 is supplied first by the AC voltage U divided according to a first phase angle $\alpha_1$ for a duration $t_1$ and, consecutively, during the other period T, by the AC voltage U divided according to a second phase angle $\alpha_2$ different from $\alpha_1$ and of a duration $t_2$. Tests permit for each load and for each power to be supplied to the load, determining the couples of angles $\alpha_1$, $\alpha_2$ respecting the harmonic current limits. From among these couples can preferably be selected a couple minimizing the FLICKER effect, given that a minimum of angle variation gives rise to a minimum of variation or commutation of power.

According to another type of operation of the process according to the invention, the phase angles $\alpha_i$ can be determined in a pseudo-random manner while, of course, maintaining the mean values of $\alpha_i$ (i being from 1 to p) at values satisfying for a given power the Standards set forth above.

So as better to understand the importance of the invention, particularly in the field of motor control by means of a continuous speed variator, there will be described hereafter the control process according to the invention in the framework of its use in a motor of the universal type with a nominal maximum controlled power of 1570 Watts and adapted to power a suction pump. With a conventional continuous variable switch, it is known that for a start-up angle of the TRIAC of 61°, namely P=1150 W, there is taken for the harmonic level 3 the value 2.74 A, while for a start-up angle of 101°, namely P=540 W, there is used at this level the value 2.52 A. Thus, these two values are therefore greater than the permitted limit of 2.3 A.

Thanks to the invention, and in the preferred embodiment in which the two different phase angles are alternated at each consecutive period (p=2 and $n_1=n_2=1$), there is obtained, either during the first period sector 61°, during the second period 101° and during the third period 61°, etc., a harmonic level 3 of only 2.21 A for a power of 1030 W. With a conventional variable switch, the harmonic level 3 would be, for an equivalent power of 2.93 A, outside the Standard EN60555-2.

The invention also relates to a device for practicing the process comprising, as shown in FIG. 8, the electronic switch 2 mounted in series with the load 1 and connected to the output of a selector means 3 adapted to select for example two time periods $t_1$ and $t_2$ and to generate at the output S control signals for the electronic switch 2 so as to fix respectively the phase angles $\alpha_1$ and $\alpha_2$.

With an electronic selector, it will be understood that the different values for $\alpha_i$ can be fixed as a function of the number of elements of the predetermined sequence.

Figure 1:
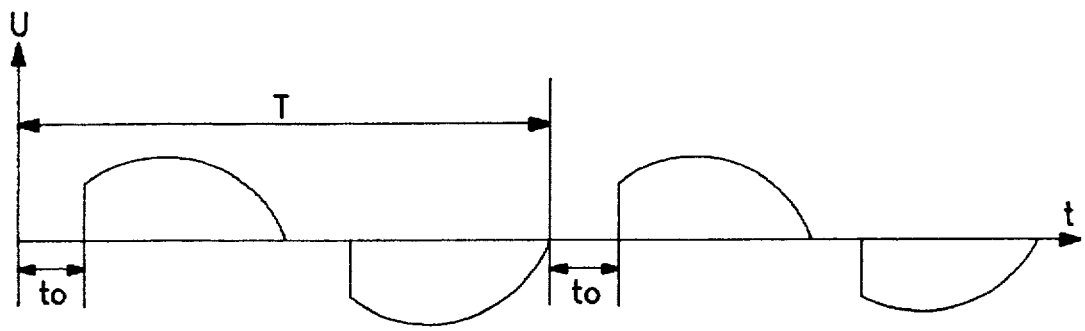
FIG. 1 is a diagram showing the variations as a function of time, of the instantaneous voltage in a conventional phase control of a resistive load.
Figure 2:
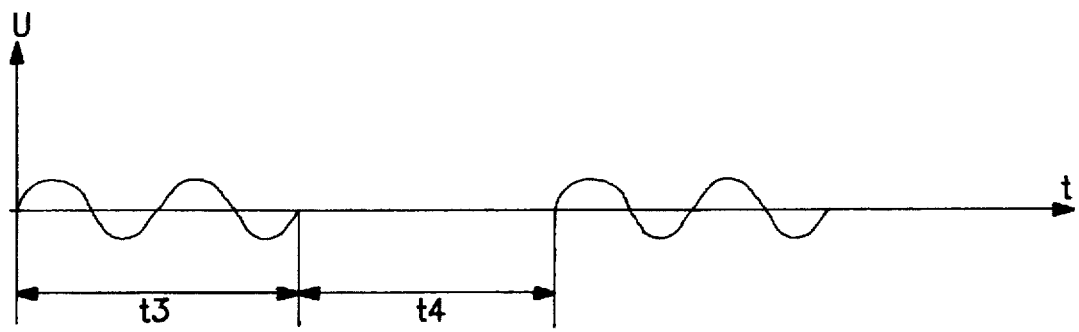
FIG. 2 is a diagram showing the variations as a function of time, of the instantaneous voltage in a classical power control with a wave train of a resistive load.
Figure 3:
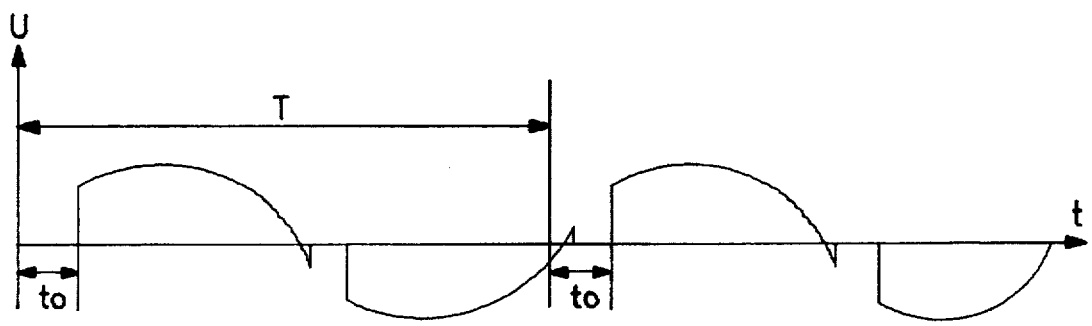
FIG. 3 is a view similar to FIG. 1 showing the case of a conventional phase control of slightly inductive load such as for example a universal motor.
Figure 4:
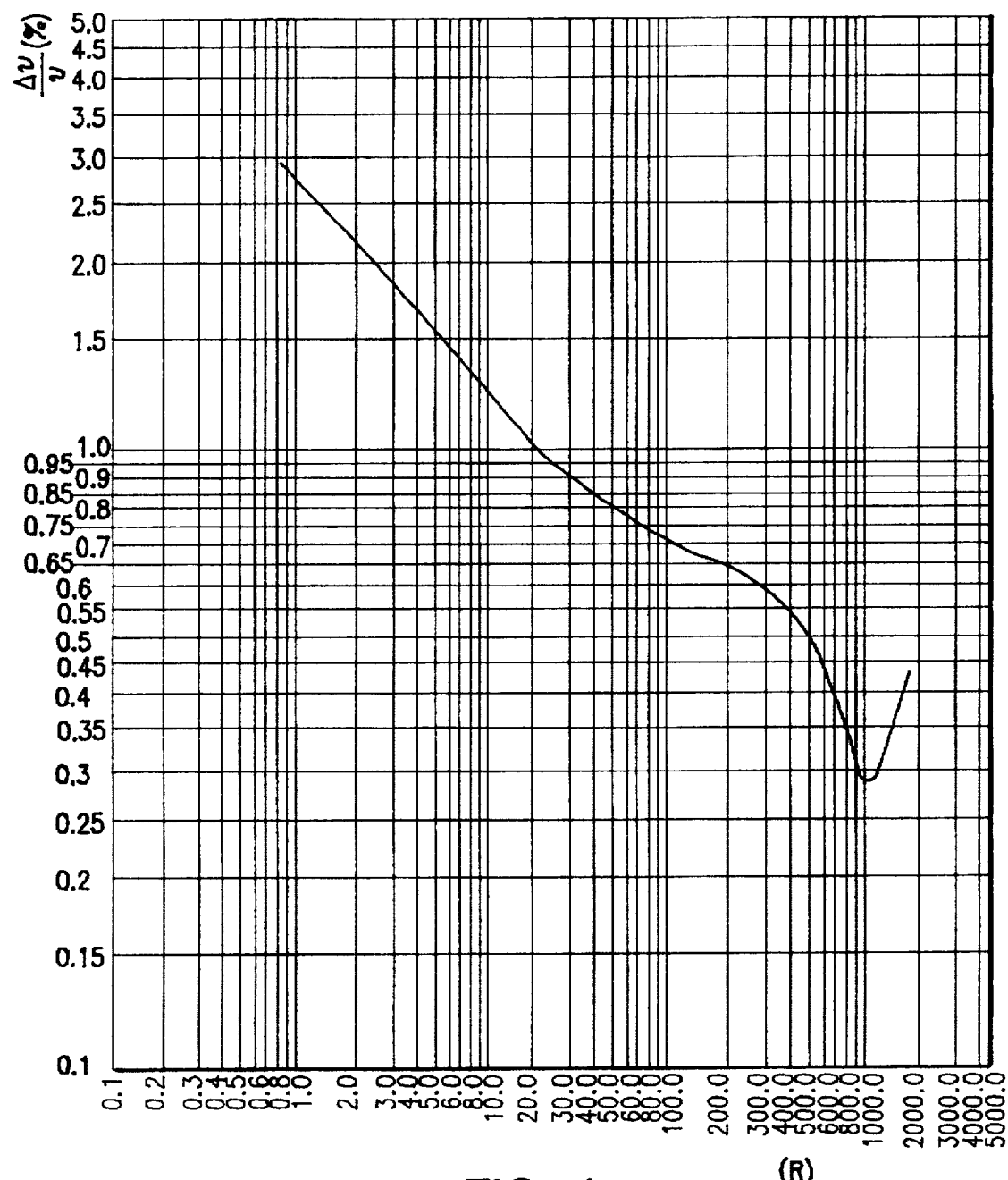
FIG. 4 is a diagram showing a predefined curve according to Standard EN60555-3 showing the variations of relative voltage $\Delta U/U$ as a function of the number of these variations per minute designated R.

Thus, for a predetermined set power, the selector means permits determining the durations $t_i$ and starting from phase angles $\alpha_i$ such that the currents induced by each harmonic and particularly by the harmonic 3 will be lower than the limits imposed by Standard EN60555-2 as is shown in FIGS. 4 and such that the relative variations of voltage $\Delta U/U$ will be located below the curve of FIG. 7 as required by Standard EN60555-3.

The electronic switch 2 can be a TRIAC and the selector means 3 can be obtained from separate components or by a programmed microprocessor to compute the durations $t_i$.

The process and the device of the invention permit obtaining a reliable supply avoiding disturbances adapted to trouble the users of the network. On the other hand, the described process is adaptable to all loads by simple programming of the control parameters of the electronic switch.

We claim:

1. Process for controlling the power supplied to a load (1) powered by AC voltage U of a period T via a system of generalized phase adjustment, comprising the step of:

for a set power, delivering successively to said load (1), periodically a sequence of a whole number p of elements, p being greater than one, each element, of number i, of the sequence being characterized by an integer $n_i$ of periods T during which the AC voltage U is divided symmetrically according to a phase angle $\alpha_i$ corresponding to a duration $t_i$ during which the load (1) is not powered, the consecutive phase angles $\alpha_i$ of the element i and $\alpha_{i+1}$ of the element i+1 being different and the combination of the angles $\alpha_1 \ldots \alpha_i \ldots \alpha_p$ being selected such that, while supplying to the load (1) the desired power, the combination of the angles satisfies a limitation of effective values of current harmonics and maintains in a permitted region the relative variations of voltage $\Delta U/U$ as a function of the number of variations per unit time on an impedance source.

2. Process according to claim 1, wherein the number p of elements is equal to two.

3. Process according to claim 1,
wherein the p numbers $n_i$ are all equal to one.

4. Process according to claim 1,
wherein the number p of elements is equal to two and the p numbers $n_i$ are all equal to one, namely $n_1 = n_2 = 1$.

5. Process according to claim 1,
wherein the angles $\alpha_i$ are fixed in a pseudo-random manner.

6. Process according to claim 1,
wherein the load is a universal motor.

7. Device for controlling the power supplied to a load (1) powered by AC voltage U of a period T via a system of generalized phase adjustment, comprising:

an electronic switch (2) mounted in series with the load (1) at the terminals of a source of AC voltage U;

selector means (3) with an output connected to said switch and adapted to select durations $t_i$ and to generate control signals for the electronic switch (2) so as to provide successively to said load (1), periodically a sequence of a whole number p of elements, p being greater than one, each element, of number i, of the sequence being characterized by an integer $n_i$ of periods T during which the AC voltage U is divided symmetrically according to a phase angle $\alpha_i$ corresponding to a duration $t_i$ during which the load (1) is not powered, the consecutive phase angles $\alpha_i$ of the element i and $\alpha_{i+1}$ of the element i+1 being different and the combination of the angles $\alpha_1 \ldots \alpha_i \ldots \alpha_p$ being selected such that, while supplying to the load (1) the desired power, the combination of the angles satisfies a limitation of effective values of current harmonics and maintains in a permitted region the relative variations of voltage $\Delta U/U$ as a function of the number of variations per unit time on an impedance source.

8. Device according to claim 7,
wherein the electronic switch (2) is a TRIAC.

9. Device according to claim 8,
wherein the selector means (3) is a microprocessor.

* * * * *